United States Patent [19]

Sanders et al.

[11] Patent Number: 4,754,255
[45] Date of Patent: Jun. 28, 1988

[54] USER IDENTIFYING VEHICLE CONTROL AND SECURITY DEVICE

[76] Inventors: Rudy T. Sanders, 9520 Rhea Ave., Northridge, Calif. 91324; Lee Fleishman, 2169 Brookfield Dr., Thousand Oaks, Calif. 91362

[21] Appl. No.: 50,319

[22] Filed: May 14, 1987

Related U.S. Application Data

[63] Continuation-in-part of Ser. No. 588,575, Mar. 12, 1984, abandoned.

[51] Int. Cl.$^4$ .................... B60R 25/04; G06F 7/04
[52] U.S. Cl. .................................. 340/64; 340/63; 340/539; 340/528; 340/696; 340/825.31; 340/825.69; 307/10 AT; 180/287
[58] Field of Search .................. 340/64, 63, 65, 52 R, 340/52 D, 506, 528, 539, 531, 696, 825.31, 825.06, 825.32, 825.34, 825.69, 825.72, 534, 365 R, 346; 307/10 AT, 10 R; 180/173, 287; 455/603

[56] References Cited

U.S. PATENT DOCUMENTS

| | | | |
|---|---|---|---|
| 3,703,714 | 11/1972 | Andrews | 340/63 |
| 3,969,709 | 7/1976 | Isaacs et al. | 340/528 |
| 3,978,478 | 8/1976 | Schmitz | 340/528 |
| 4,159,466 | 6/1979 | Mengel | 340/63 |
| 4,333,090 | 6/1982 | Hirsch | 340/64 |
| 4,342,024 | 7/1982 | Rossi | 340/64 |
| 4,383,242 | 5/1983 | Sassover et al. | 340/539 |
| 4,463,340 | 7/1984 | Adkins et al. | 340/64 |

FOREIGN PATENT DOCUMENTS 2051442  1/1981  United Kingdom ................ 340/63

Primary Examiner—Donnie L. Crosland
Attorney, Agent, or Firm—Sanford Astor

[57] ABSTRACT

A vehicle control and/or access control and/or anti-theft system for motor vehicles including data entry apparatus designed to enter a predetermined signal, a decoder for processing the signal, apparatus to recognize which one of a plurality of valid signals was entered, and apparatus to control vehicle electrical functions in response to which valid signal was recognized. In the anti-theft system, operation of the vehicle is disabled by interrupting an essential vehicle circuit, and a method is provided together with the decoder for preventing the operation of the vehicle disabling system so that when the operator enters his specific signal the automobile can then be started and operated. In addition, the system monitors all points of entry into the vehicle, and also monitors various sensors for unusual disturbances. The system sounds a siren alarm and/or flashes the vehicle's interior lights, parking lights, and/or headlights, in the event of unauthorized entry or unusual disturbance. The system has the ability to differentiate between a plurality of authorized operators of the vehicle, and contains a logic processing device adapted to interface to automotive electrical functions such as memory devices programmed to adapt specific automotive functions to a plurality of operators. The system provides a diagnostics mode, enhanced exit supervision and a plurality of user-programmable features.

54 Claims, 5 Drawing Sheets

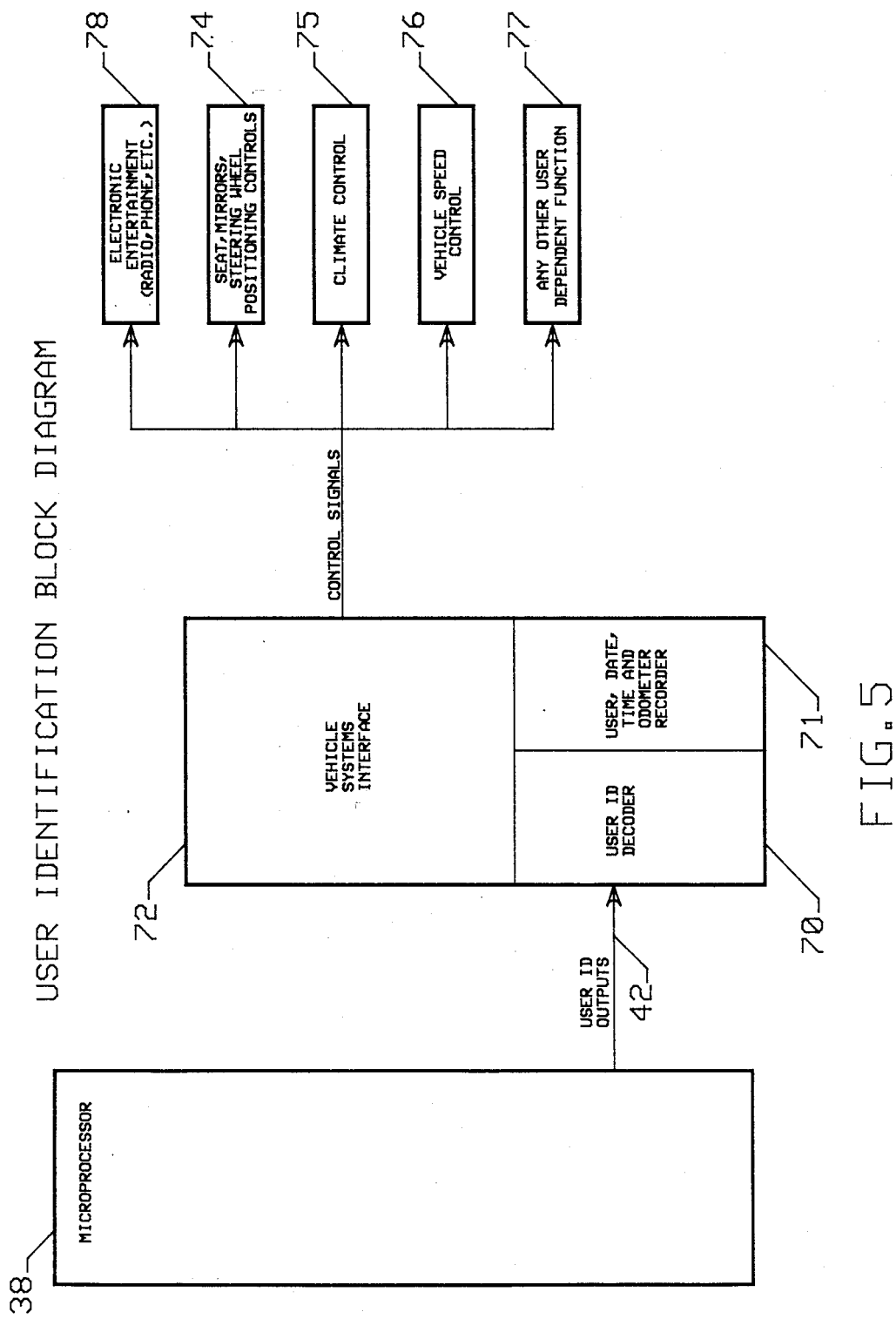

USER IDENTIFYING VEHICLE CONTROL AND SECURITY DEVICE

This application is a continuation-in-part of our co-pending application Ser. No. 588,575 filed Mar. 12, 1984 now abandoned.

BACKGROUND OF THE INVENTION

In recent years there has been a tremendous increase in the rate of automobile thefts and vandalism and theft from automobiles throughout the nation. Many different types of automobiles anti-theft systems have been designed and marketed. Early systems utilized a unique key-operated switch located on the vehicle's exterior to arm and disarm the system. These keyswitch controlled systems had many shortcomings, including the fact that the connecting wires of the key-switch itself could be bypassed by anyone with knowledge of the automobile system. In addition, the key could be stolen or easily duplicated and used by the thief himself.

Later systems sought to remedy the shortcomings of the earlier key-switch systems, by eliminating the key-switch itself. These "keyless" systems utilized various means to control arming and disarming, including switches hidden from plain view within the passenger compartment, the vehicle's own ignition switch, and digital keypads. However, these "keyless" systems also suffered from a significant shortcoming: if a door to the passenger compartment were opened, the alarm would only sound after an entry delay time, so as to allow the owner enough time to enter the passenger compartment and disarm the system. During this delay time, a thief could steal the stereo unit or other contents of the automobile, and furthermore damage the automobile or even defeat the alarm system, and steal the automobile.

Most recent systems attempt to remedy the entry delay shortcoming by employing remote control techniques. The vehicle owner utilizes a small transmitter to disarm the system from outside of the vehicle prior to entry. However, even these systems suffer the disadvantage of the earliest key-switch types: a lost or stolen transmitter could be used by the thief himself.

OBJECTS OF THE INVENTION

It is an object of the present invention to provide a vehicle control and/or anti-theft system which is highly effective and easy to use.

It is a further object of the invention to provide a new and novel vehicle anti-theft system providing more security than any system previously manufactured. This is accomplished by the use of a programmable owner input digital code system in which the code may be entered to disarm the system by remote control, so as to eliminate the need for any entry delay time. In addition, the system of this invention provides added optional convenience and security featuers heretofore unavailable. It is a further object to provide a new and special type of "user identification" which identifies which of several different legitimate operators is using the system, and thus the automobile, at any given time. The system can differentiate between several different legitimate operators and interface to a plurality of operator-specific memory controlled automotive functions such as driver's seat position, steering wheel tilt and telescope position, mirror position, radio station presets, climate control settings, maximum vehicle speed, cellular mobile telephone operation, phone number selections, etc.

It is still a further object of the invention to provide a diagnostics mode of operation which provides the means to evaluate the integrity of the system and its various peripheral components at any given time.

DESCRIPTION OF THE INVENTION

The operational characteristics of this invention are divided into two major functional groups: (1) security and system control functions, and (2) user identification functions, i.e. identification of, and differentiation between, several individuals who are each authorized to operate the vehicle. This application describes one possible embodiment of this invention. One of the components comprising this embodiment is a Keypad/Transmitter, which is slightly larger than a pocket watch and which may be attached to the operator's keychain if desired. The Keypad/Transmitter features twelve pushbuttons labeled with the numbers zero through nine, asterisk (*), and pound (#) symbol. The Keypad/Transmitter is used to broadcast a personal multi-digit code to disarm the system from outside of the vehicle prior to entry. In addition to, or as an alternative to the Keypad/Transmitter, several Single-Button Transmitters may also be utilized. Each of the single-button transmitters is encoded so as to broadcast a unique digital code whenever the transmitter's button is depressed.

As a back-up in the event that the Keypad/Transmitter or the Single-Button Transmitters are lost, a Keypad Command Center is mounted within the passenger compartment of the vehicle. The Keypad Command Center provides an array of pushbuttons similar to those of the Keypad/Transmitter, along with a plurality of indicator LEDs and a piezo element audio sounding device.

The integrity of the system of this invention is not compromised should a Keypad/Transmitter be lost or stolen. The Keypad/Transmitter can be used to disarm the system only if its owner's personal multi-digit code is entered correctly. The code may contain from as few as 3 to as many as 9 digits. In this manner, the remote digital system provides more than one billion possible codes from which the owner can choose. In addition, each system is factory-assigned to any one of a plurality of different digital channels. As a result, billions and billions of unique disarm codes are available.

Once the system has been armed by means of either the Keypad/Transmitter or an encoded single-button transmitter, a loud electronic siren alarm will be tripped instantly upon any unauthorized entry into or disturbance of the vehicle unless the system is first disarmed by the owner. Therefore, the vehicle and its contents are far more secure from theft than with less sophisticated, entry-delay-type alarms.

The system's Microprocessor or other logic processing device can be set up to decode a multiple number of codes, so that for instance there can be a master code for the "master operator", a separate code for a second operator, such as a spouse, and separate codes for other operators, such as employees, or even a temporary code for the mechanic. Only the "master operator" can program the system. That is, only the master code will allow the "master operator" to engage the programming mode, whereas the other user codes do not allow programming. Once the program mode has been engaged, the master operator may then establish (program) the other access codes, as well as alter the master code itself.

Upon entry of any of the valid access codes (upon either the Keypad/Transmitter or the Keypad Command Center), or receipt of the predetermined digital signal from any of the single-button transmitters, a binary output from the system's Microprocessor represents which of the valid codes was decoded, or which one of the Single-Button Transmitters was used. This is intended as an identification of the person operating the vehicle at that time. With that information, the system is capable of interfacing with and controlling things such as memory seat positions, mirror position, steering wheel tilt/telescope position, radio station presets, climate control settings, navigation control or speed control. The system can also control whether or not certain items will operate, such as a mobile telephone or an audio entertainment system, based upon which operator is using the vehicle at that time.

Another benefit of the unique Keypad/Transmitter is that multi-car families may protect all of their vehicles by installing an additional system in each of the other vehicles. They can then selectively disarm the system in any one vehicle so protected, with any one Keypad/Transmitter, simply by entering the specific multi-digit code for that vehicle and authorized operator.

The arming method of this invention categorizes it as a "passive" system. This means that if the system is not actively armed by the operator through the use of either the Keypad/Transmitter or one of the Single-Button Transmitters, the system will automatically arm itself after an exit delay time whenever the ignition key is turned off. The exit delay time allows the driver and passengers enough time to exit the vehicle and take with them any packages or belongings. The exit delay time may be set by the master operator from 10 to 120 seconds. If the system has been armed in this manner, and any of the doors to the passenger compartment is subsequently opened, the system will provide an entry delay time (instead of tripping the alarm siren instantly), to allow the authorized operator to disarm the system by entering his personal access code upon the Keypad Command Center. If the system is not disarmed prior to the expiration of the entry delay time, the system's alarm siren is then tripped. The entry delay time may be set by the master operator from 1 to 45 seconds. Unauthorized opening of the vehicle's engine compartment or luggage compartment will cause the system's alarm siren to be tripped instantly (without any entry delay) regardless of the method used to alarm the system.

If, after the system has been armed, it detects a disturbance to a sensor (sound, motion, impact, shock, etc.), the alarm siren will be tripped after a one second delay. However, if the system had been armed passively, rather than actively with a transmitter, and subsequently detects the opening of a passenger compartment door during the one second delay initiated by a disturbance to a sensor, the alarm siren will not be tripped at the end of the one-second delay. Instead, the entry delay is begun. This one-second delay is intended to prevent false alarms that might otherwise occur if a sensor responds, for example, to a key being inserted into the vehicle's door to unlock it upon normal entry.

In addition, a "valet mode" is provided to override the automatic passive arming feature to allow for extended loading and unloading, vehicle service, parking attendants, etc.

The automatic "passive" arming feature of this invention provides enhanced exit supervision in a manner that has heretofore never been accomplished in this field. This system allows a much shorter exit delay time than is now common, thereby providing greater security. It does this by monitoring the state of all trigger inputs in several protection "zones." These zones are the passenger compartment, the engine compartment, the trunk, and additional "sensor zones" for such devices as motion, impact, and/or glass breakage sensors. The system monitors all zones continuously. When the ignition key is turned off, the system automatically begins its passive arming process. If all of the zones are secure at that time, normal arming takes place. If all the zones are secure for the duration of the exit delay, the system will arm. If during the exit delay, any one of the zones become active (such as if a door is opened), the exit delay is temporarily suspended and reset to its maximum time value and when the vehicle is again secure, the exit delay begins again. In this way, the operator can remove the ignition key, open the door and exit from the car, leaving the door open to remove personal belongings from the car and the system will not activate until all doors are closed. The danger of this feature is that there could be a point of entry such as the hood, which if open (or if it "appeared" to the system to be open as the result of a pinched wire), would interrupt the passive arming cycle without the knowledge of the operator. If this were allowed to continue, the system would never arm.

The system of this invention solves this serious problem by continuously monitoring all protected zones many times per second. If any of the protected zones are not secure when the ignition key is turned off, that information is stored in the Microprocessor. The passive arming cycle proceeds with the exit delay "counting down," ignoring the unsecured zone. When the exit delay time lapses, the system would be allowed to arm and protect all zones other than the one that was not secured when the ignition key was turned off. If the unsecured zone becomes secure during the exit delay period, the Microprocessor automatically begins monitoring that zonen for supervised exit. If the unsecured zone becomes secure after the exit delay time has lapsed and the system has armed, the Microprocessor automatically begins monitoring that zone for unauthorized entry.

During the arming cycle, the red LED on the Keypad Command Center is on but blinks off once per second, and the Keypad Command Center's piezo element beeps once per second. If any door is opened, the piezo element stops beeping but the red LED continues to blink off at the once-per-second rate. If the door is then closed, the piezo starts beeping again, once per second during the arming cycle, then stops when the system is armed.

If there is an unsecured zone at the time the ignition key is turned off, the piezo element will beep 3 times per second (instead of once per second) to warn the operator that at least one zone will not be protected when the system arms. If the zone is subsequently secured during the exit delay time, the piezo will beep at its normal rate of once per second for the remainder of the exit delay time.

If the vehicle operator actively arms the system utilizing one of the transmitters, there is no entry delay or exit delay. If all zones are secure when the system receives the arming command broadcast from the transmitter, the alarm siren will "chirp" once and the vehicle's interior lights, parking and/or headlights will flash once as multiple acknowledgements that the system has armed and the vehicle is protected. However, if there is a zone that is not secure when the operator attempts to arm the system with a transmitter, the system will immediately arm and protect the secured zones, leaving the unsecured zone(s) unprotected. In this instance, upon receipt of the arming command broadcast from the transmitter, the alarm siren will "chirp" three times instead of the usual single chirp, and the vehicle's interior lights, parking and/or headlights will flash three times instead of their usual single flash. The operator can then return to the vehicle and check to see which zone is not secure, perhaps utilizing the system's diagnostics mode discussed in detail later.

As an extension of the system's ability to monitor the zones individually and continuously, if the alarm siren is tripped in response to unauthorized entry or disturbance, it will continue to sound for the specific time duration programed by the master operator. Once this time duration has lapsed, the alarm siren will stop sounding, unless a zone is not secure. In this instance, the alarm siren will continue to sound. If the alarm sounds for 8 minutes continuously, the zone causing it to sound is then ignored by the Microprocessor, allowing the system to reset (stop sounding the alarm) and continue monitoring the remaining zones for unauthorized entry. The ignored zone is not completely ignored, however. If it subsequently becomes secured, it will again be monitored for unauthorized entry.

This maximum alarm sounding time feature is handled somewhat differently with regard to sensors such as glass breakage detector, shock, vibration or motion sensors. Since the output response from these devices, when stimulated, is a short duration pulse, as opposed to the continuous trigger condition presented by an open door, the system will accumulate the overall length of time that the alarm sounds if tripped repeatedly by such sensors. When the cumulative time reaches a total of 8 minutes, the sensor zone responsible will then be ignored until the system is disarmed by the operator. The benefit of this feature is the minimization of chronic false alarms resulting from, for example, a motion sensor adjusted too sensitively which reacts unnecessarily to passing traffic.

Additional features of this invention include the following:

Ignition or starter bypass. The engine cannot be started unless the system is disarmed.

If, when the system is armed, it detects an attempt in progress to disarm the system by means of either random or sequential broadcast of digital data representing possible disarm codes, the alarm siren will be tripped if the attempt continues beyond a predetermined time limit.

As a back-up in the event that the Keypad/Transmitter or the Single-Button Transmitters are lost, an internally mounted keypad command center with a plurality of indicator LEDs and a piezo audio sounding device is provided. One LED flashes when the system is armed to provide notice to any thief that the car is protected by an alarm system. Other LEDs indicate the valet mode and program mode.

Outputs are provided to engage electromechanical actuators so as to lock and unlock the doors to the passenger compartment concurrent with remote control arming and disarming, respectively.

Additional outputs are provided to enable remote control functions such as trunk or rear hatch opening, garage door opening and closing, and engine starting, using the Keypad/Transmitter.

Automatic memory functions such as seat position settings, radio station presets and climate control settings can be preset for each user, and initiated remotely from the Keypad/Transmitter, any one of the Single-Button Transmitters, or other data entry means such as a vehicle mounted data entry device.

The nominal operating range of the system is approximately fifty feet in line of sight. No receiver antenna is required on the outside of the vehicle. The batteries used in the transmitters are commonly available batteries. The battery life is normally about one year.

The system's parameters programmed by the master operator are maintained virtually forever by a nonvolatile random access memory device such as one sold under the name "Novram", a trademark of XICOR Corp. No reserve battery is needed to maintain the memory. If the vehicle's battery is disconnected or becomes exhausted, all system parameters, plus the arm, disarm, or valet status of the system at the time of power loss, will be intact when power is restored to the system.

There are various two-button combinations that can be entered upon either the Keypad/Transmitter or the internally-mounted Keypad Command Center as commands to the system. These are, for instance, depressing buttons 5 and 8 simultaneously for a panic alarm which will instantly trip the alarm siren (from up to fifty feet away if initiated from the remote Keypad/Transmitter) regardless of the operating mode that the system is in. Depressing buttons 4 and 6 simultaneously is an auxiliary command which could be used to open the trunk. Depressing buttons 6 and 9 simultaneously is a second auxiliary command which could be used, for instance, for starting of the automobile. Depressing buttons 8 and 9 simultaneously could activate a separate garage door opener transmitter. The system is designed so that these particular commands can be initiated at any time from the internal keypad command center in the automobile. However, these 2-button commands, with the exception of the panic command, can only be initiated with the Keypad/Transmitter within 30 seconds after a valid access code is entered. This is a safety feature so that other Keypad/Transmitters on the same channel won't activate these particular commands.

The system is designed to provide additional two-button commands that can only be initiated from the Keypad Command Center within the passenger compartment. These commands are used to alter the system's operating characteristics. For example, depressing the numbers 8 and 0 simultaneously engages the diagnostics mode which provides a means of evaluating the integrity of the system and its peripheral components. Depressing buttons 2 and 4 simultaneously will allow a pager to be active even if the system is not armed. That is, if the operator carries a remote pager which signals when the alarm sounds, this command will enable the pager to respond to unauthorized entry or disturbances even if the siren itself does not sound. Thus, the pager reacts to all trigger inputs that would activate the alarm siren if armed. This is called the silent mode of operation and can be used, for instance, when parking in a hospital zone or if the operator is in a restaurant and wants to know if the vehicle is entered even though the alarm system is not armed.

An additional two-button command that can be used is, for instance, depressing numbers 2 and 6 simultaneously which causes the system to ignore any disturbances, such as noise, motion, impact, or ultrasonic, that might be detected by one or more of the sensors that comprise the system's sensor zones of protection. In this mode, the system will only monitor points of entry, such as passenger compartment doors, trunk and hood. This could be used for example when parking in a high noise or vibration area.

When the system's diagnostics mode is engaged (by simultaneously depressing the numbers 8 and 0 on the Keypad Command Center), the LEDs on the Keypad Command Center will display the status of the trigger input zones. The yellow LED, which is normally the valet mode indicator, will illuminate when the hood and/or trunk is open. The red LED, which is normally the arm/disarm status indicator, will illuminate when any door to the passenger compartment is open, and the green LED, normally the program mode indicator, will illuminate whenever any one of the sensors that comprise the sensor zones, such as the glass breakage detector, shock, vibration or motion sensor detects a disturbance. The operator can thus monitor how the system is operating and if there is an intrusion indication, which zone or zones of the system are causing the intrusion indication.

In the diagnostics mode, the Keypad Command Center's piezo element provides an audible indication of the performance of the transmitter and receiver sections of the system. The piezo element converts signals received by the system's receiver into an audio tone. Under normal conditions, if the system's receiver is functioning properly, and no transmitter is broadcasting, random background static will be heard from the Keypad Command Center's piezo element. If a button is depressed on a transmitter and an audio tone is heard from the Keypad Command Center's piezo element, then the system's transmitter is working properly; but if no audio tone is heard, either the system is not receiving the signal from the transmitter, or the transmitter itself is not functioning properly. In this way, using the diagnostics mode, the operator can evaluate how the system's transmitter and receiver are operating. The diagnostics mode can also be utilized so that all output devices of the system can be individually tested. For instance, depressing a predetermined button on the Keypad Command Center would cause the siren to sound, another button might cause the headlights to flash. In this manner all output aspects of the system may be evaluated for their operability.

If the system's alarm siren is tripped in response to unauthorized entry or unusual disturbance during the operator's absence, the system will inform the operator of this fact when he or she returns to the vehicle. This "attempted theft indication" is comprised of several elements:

1. The red status LED on the Keypad Command Center will be blinking rapidly rather than slowly, and
2. If the operator disarms the system by entering a disarm code upon the Keypad Command Center, the Keypad Command Center's piezo element will emit eight beeps in rapid succession, or
3. If the operator disarms the system using a transmitter, the alarm siren will issue a long blast, instead of the usual two "chirps," and the vehicle's interior lights and parking and/or headlights will flash on for one full second, instead of the usual two short flashes.

The red status LED on the internal keypad of the system gives several indications:

1. If it is on continuously, it is indicating that the system is disarmed;
2. If it is blinking on slowly, it is indicating that the system is armed;
3. If the inverse of (2) occurs, that is, if the red LED is blinking off slowly, it is indicating that the arming cycle is in progress;
4. If it is flashing rapidly, it is indicating that the alarm siren has been tripped during the operator's absence;
5. If it is off, either the Valet Mode or the Program Mode of the system is engaged. If the Valet Mode is engaged, the yellow LED will be illuminated. If the Program Mode is engaged, the green LED will be illuminated.

When the Program Mode is engaged, the "master operator" has the ability to program various operating characteristics or parameters of the system. There are a multiple number of programmable parameters of the system. For example, the following are nine programmable parameters:

1 through 4 are the four access codes available to the system, that is, the one master code and three additional subordinate access codes;
5. Whether or not the sensor zones are monitored;
6. Whether or not the siren chirps to acknowledge arm and disarm commands received from a transmitter. In an area such as a hospital zone, this could be turned off, leaving only the flashing of the vehicle's interior lights and parking and/or headlights as acknowledgements of remote arm/disarm commands;
7. The entry delay time can be programmed;
8. The exit delay time can be programmed. The entry delay time (7) and the exit delay time (8) are defaults, that is, they are time periods that the system provides only when the system is armed passively. When the system is armed actively using a transmitter, the entry delay time and exit delay time are not utilized.
9. The alarm sounding duration time can also be programmed.

DESCRIPTION OF THE DRAWINGS

Other objects and features of the invention will be described in reference to the drawings in which:

FIG. 5 is a block diagram of the user identification system of the present invention.

Referring now to FIG. 1, there is shwon the block diagram of the Keypad/Transmitter. A battery 12 provides the power for the Keypad/Transmitter. The battery 12 is connected to a power switch 13 which operates as the power supply switch for the unit. The switch 13 is a transistor or other active semi-conductor device which receives a turn-on control signal whenever any button or buttons of the keypad 11 is (are) depressed. The keypad 11 of the Keypad/Transmitter is normally a simple one-of-twelve/common buss keypad. A diode matrix 14 encodes the depression of a specific button or buttons of the keypad 11 into specific binary coded data for processing by a serial data generator 15. The binary coded data from the diode matrix 14 is fed into a predetermined plurality of the address inputs of the serial data generator 15. Remaining address inputs of the serial data generator 15 comprise the channel assignment means 17. Each of the address inputs of the serial data generator 15 that comprise the channel assignment means 17 may be selectively connected to the positive side of the battery 12, or to the negative side of the battery 12, or left unconnected. The serial data generator 15 is compatible to the Keypad/Transmitter decoder 33 as shown on FIG. 3 and described later. The serial data generator 15 is designed to convert the binary coded data from diode matrix 14, and the data comprising the channel assignment, into a specific digital pulse train, unique to the keypad button or buttons depressed. Serial data generator 15 incorporates an oscillator which is used to establish the encoding and pulse train timing. This oscillator signal is also connected to a piezo disk 16 to produce an audible tone whenever a button or buttons of the keypad 11 is (are) depressed. A transmitter 18, for instance, is a high frequency colpits oscillator, or other similar oscillator configurations. It is activated by base bias established by the pulse train output generated by the serial data generator 15.

Referring now to FIG. 2, there is shown the single-button transmitter block diagram. The Single-Button Transmitter is powered by a battery 21 connected to a power switch 22. The switch is depressed by the operator to activate the single-button transmitter. A predetermined plurality of the address inputs of the serial data generator 25 are connected to the access code encoder 23, while the remaining address inputs of the serial data generator 25 are connected to the user identification assignment means 24. The access code encoder 23 and the user identification assignment means 24 are used to selectively connect each of the address inputs of the serial data generator 25 to either the positive side of the battery 21, or negative side of the battery 21, or left unconnected. The access code for all of the Single-Button Transmitters associated with a particular system, as determined by the access code encoder 23, will be the same, while the user identification assignment of each of the Single-Button Transmitters associated with a particular system, as determined by the user identification assignment means 24, will vary. Thus, a plurality of unique Single-Button Transmitters could be used to provide system access to a plurality of different operators, while each operator could be uniquely detected and identified by the system. The serial data generator 25 is compatible to the single-button transmitter decoder 34 as shown on FIG. 3 and described later. The serial data generator 25 is designed to convert the information represented by the configuration of the access code encoder 23, and the user identification assignment 24, into a specific serial digital pulse train, unique to that particular single-button transmitter. Serial data generator 25 incorporates an oscillator which is used to establish the encoding and pulse train timing. This oscillator signal is also connected to a piezo disk 26 to produce an audible tone whenever the power switch 22 is depressed. A transmitter 27, for instance, is a high frequency colpits oscillator, or other similar oscillator configurations. It is activated by base bias established by the pulse train output generated by the serial data generator 25.

Referring now to FIG. 3, there is shown a block diagram of the remote communications system of the invention. Keypad/Transmitters 30, of the type described in FIG. 1, and Single-Button Transmitters 31, of the type described in FIG. 2, are shown. A vehicle mounted data entry device 30A may also be used. When activated, the transmitter(s) 30 and/or 31 broadcast their signals on an infrared, RF, or other carrier to a Receiver 32. The Receiver 32 is adapted to receive the broadcast from both Keypad/Transmitters 30 and single-button transmitters 31. The Receiver 32 can, if it is an RF receiver, include a super regenerative amplifier and detector or other RF receiver which reproduces the transmitted pulse coded information. A signal conditioner and level shifter can be biased to greatly amplify the signal. Also, hysteresis can be provided to reduce the effects of background noise and increase range. The vehicle mounted data entry device 30A is connected directly to the Microprocessor 38.

When the Receiver 32 receives a broadcast signal, the serial digital data it extracts from the broadcast signal is simultaneously fed to Keypad/Transmitter decoder 33, to the single-button transmitter decoder 34, and to the diagnostics logic circuits, described later.

Figure 1:
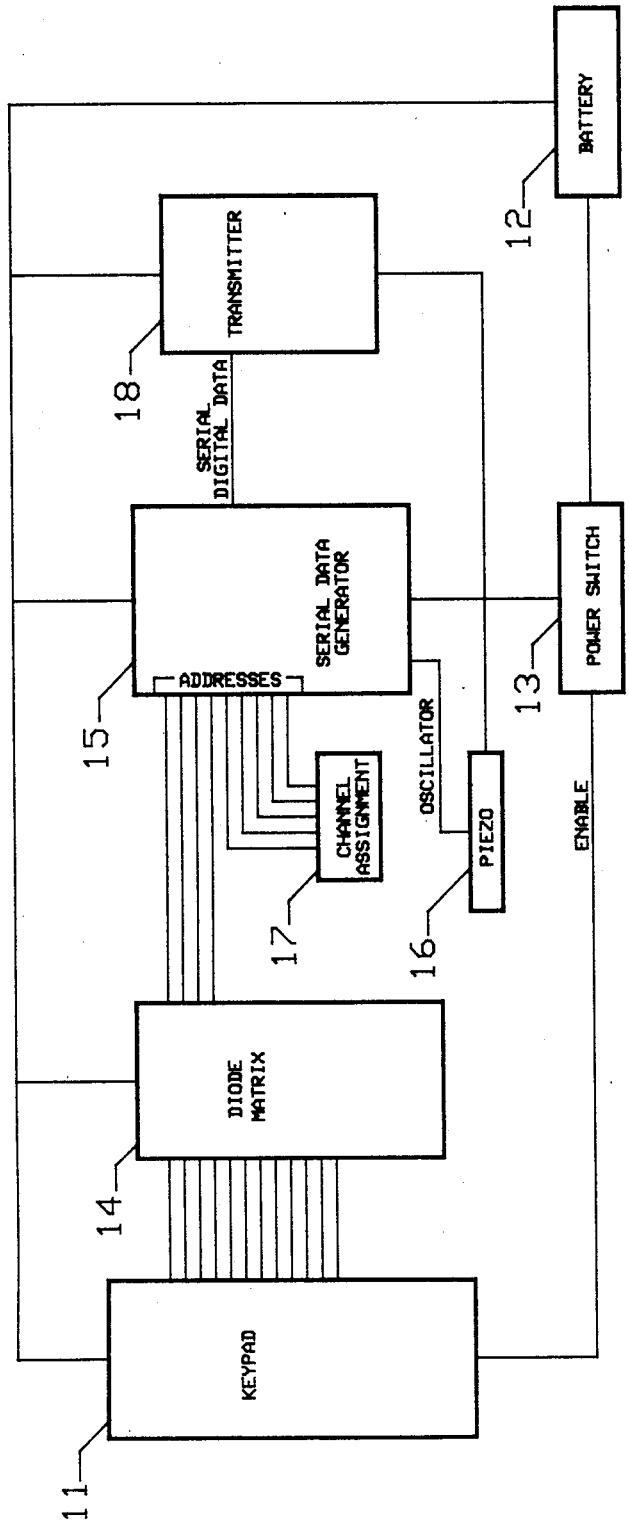
FIG. 1 is a block diagram showing the keypad/transmitter of the present invention.

Address inputs of the Keypad/Transmitter Decoder 33 are connected to the channel assignment means 35. The channel assignment means 35 is used to configure the address inputs of the Keypad/Transmitter decoder 33 so as to match the configuration of the channel assignment means 17 (described in FIG. 1) of the Keypad/Transmitter 30. This is done to prevent the recognition of serial digital data from the Receiver 32 unless the data was broadcast from a Keypad/Transmitter whose channel assignment means 17 had been configured so as to match the configuration of the channel assignment means 35 of the Keypad/Transmitter Decoder 33.

When the Keypad/Transmitter decoder 33 processes matching-channel serial digital data from the Receiver 32, a valid transmission signal 36 is generated, along with binary coded Keypad/Transitter data 37 that is representative of the specific keypad button or buttons depressed on the Keypad/Transmitter. The valid transmission signal 36, and the binary coded Keypad/Transmitter data 37 is fed to a Microprocessor 38, which then processes the binary coded Keypad/Transmitter data 37 to determine which specific button or buttons of the Keypad/Transmitter was (were) depressed. The Microprocessor 38 continues to process data from the Keypad/Transmitter Decoder 33 to determine if a valid sequential multi-digit access code has been broadcast. A plurality of specific sequential multi-digit access codes used to operate the system may be programmed into the memory of the microprocessor 38 by the operator. Other logic processing devices such as gate arrays, programmable logic arrays, or transistor and integrated circuit logic can be used in place of a microprocessor.

The Microprocessor 38 can be programmed to cause the alarm to sound whenever a valid transmission signal 36 from the Keypad/Transmitter decoder 33 is present in excess of a predetermined anti-scan integration time (approximately 10 seconds). If a Keypad/Transmitter 30 were used to randomly broadcast different codes, in an attempt to determine the proper code sequence, and this attempt exceeded approximately 10 seconds in duration, the alarm would sound.

The Microprocessor 38 can also be programmed to provide a panic alarm which will cause the alarm to sound for whatever period of time is preset by the user or until reset. The panic alarm can be triggered, for example, by simultaneously depressing 2 predetermined Keypad/Transmitter buttons. The panic alarm can be set to sound even if a valid access code has been entered to disarm the system.

Figure 2:
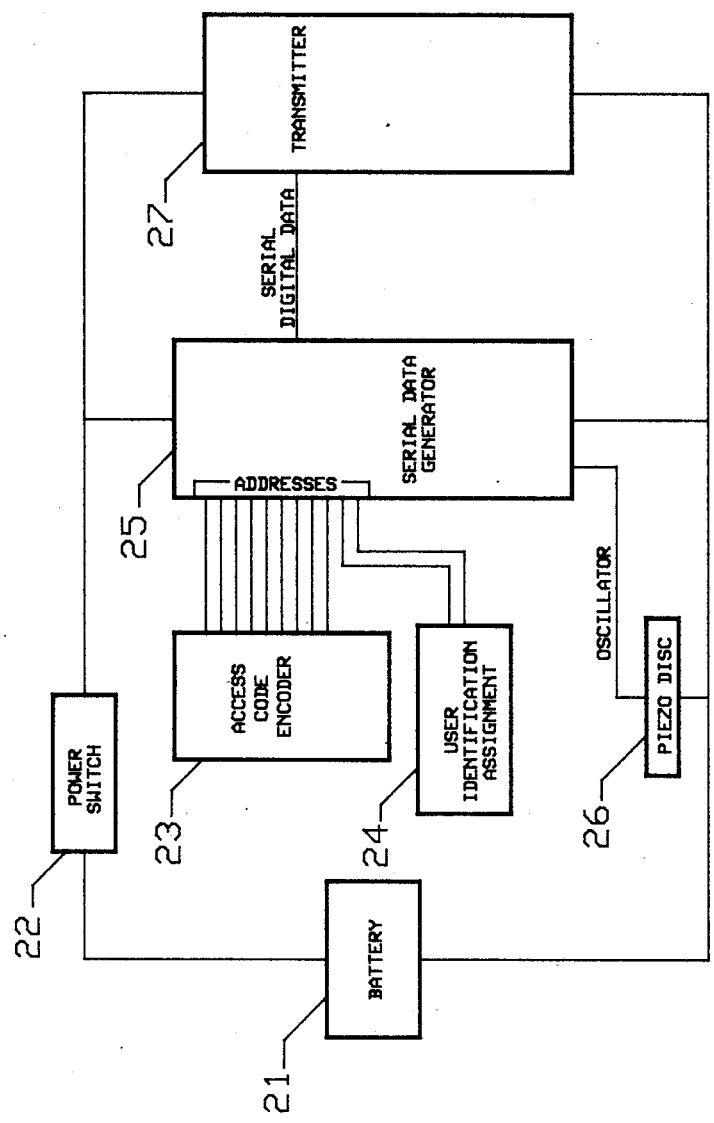
FIG. 2 is a block diagram showing the single-button transmitter.

Single-button transmitter decoder 34 processes serial digital data from the Receiver 32 when the data is broadcast by a single-button transmitter 31. The access code data means 39 is used to configure a predetermined plurality of the address inputs of the Single-Button Transmitter Decoder 34 so as to match the configuration of the access code encoder 23 (described in FIG. 2) of the Single-Button Transmitter 31. This is done to prevent the recognition of serial digital data from the Receiver 32 unless the data was broadcast from a Single-Button Transmitter 31 whose access code encoder 23 had been configured so as to match the configuration of the access code data means 39 of the Single-Button Transmitter Decoder 34.

A user identification system is provided to identify which of the plurality of single-button transmitters 31 has activated the system, or which of a plurality of valid sequential multi-digit access codes has been entered upon either the Keypad/Transmitter 30 or the Keypad Command Center 44 (described in FIG. 4) located within the vehicle. This can be done, for example, by reserving the address inputs of the single-button transmitter decoder 34 that correspond to the address inputs comprising the user identification assignment means 24 of the serial data generator 25 (described in FIG. 2) of the single-button transmitter 31. The reserved address of the single-button Transmitter Decoder 34 comprise the user identification data 40. The address inputs of the single-button transmitter decoder 34 comprising the user identification data 40 are connected to the Microprocessor 38. The Microprocessor continuously cycles these addresses through all of the possible logical states.

When the Single-Button Transmitter Decoder 34 recognizes that a signal broadcast by a Single-Button Transmitter 31 matches both the preprogrammed addresses comprising the access code data 39 and one of the possible logic states of the addresses comprising the user ID data 39, a valid transmission signal 41 is generated by the Single-Button Transmitter Decoder 34 and sent to the Microprocessor 38. The Microprocessor 38 determines which one of the plurality of single-button transmitters has been activated, based upon the logic state of the address inputs of the Single-Button Transmitter Decoder 34 comprising the user ID data 40 at the time the match was detected. A serial digital data signal representing the particular Single-Button Transmitter, and thus the user identification, is generated by the Microprocessor 38 at its user ID output 42. Additionally, when a valid multidigit access code has been received from the Keypad/Transmitter 30 or keypad command center 44 (described in FIG. 4), the Microprocessor 38 generates a serial digital data signal at its user ID output 42 that represents the user member assigned by the operator to the specific multi-digit access code received.

Figure 3:
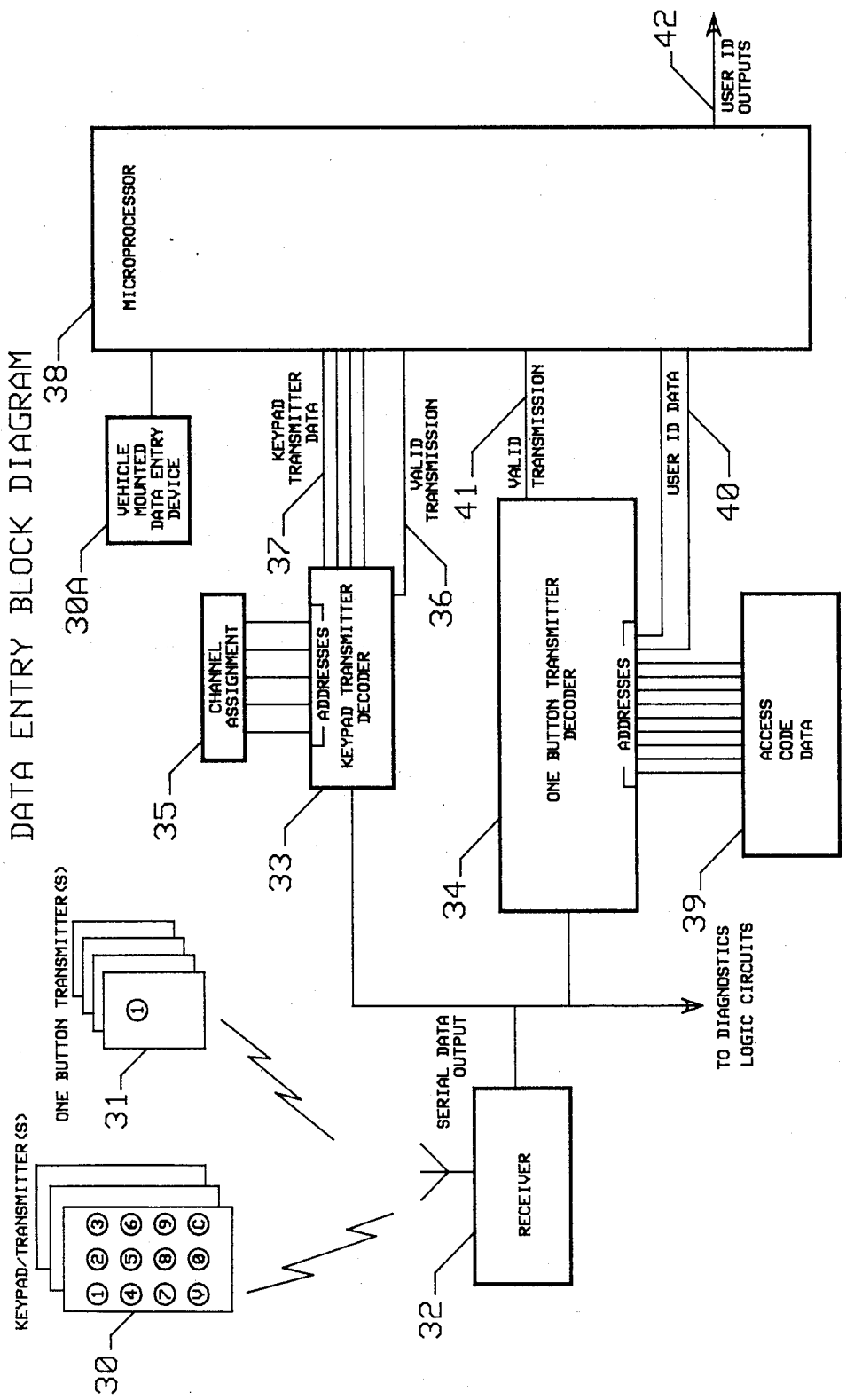
FIG. 3 is a block diagram showing the remote communication elements of the present invention.
Figure 4:
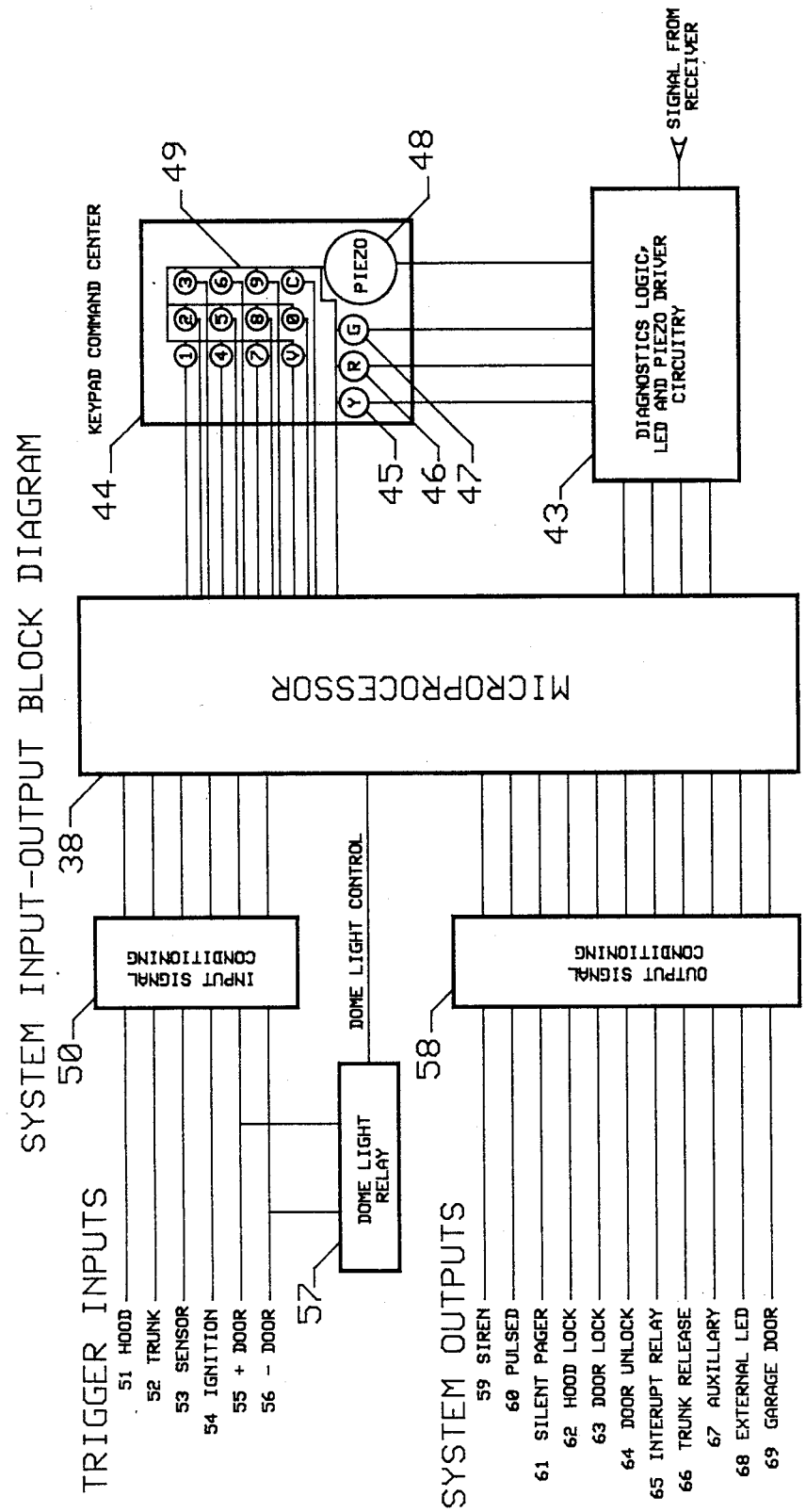
FIG. 4 is a block diagram showing the input-output system of the present invention.

Referring now to FIG. 4, there is shown the input-output block diagram of the invention. The serial digital data output from the Receiver 32 (described in FIG. 3) is fed into the diagnostics logic, LED and piezo driver circuitry 43. The Keypad Command Center 44 incorporates 3 LEDS (yellow 45, red 46, and green 47) and a piezo 48. Control signals for the 3 LEDs 45, 46, and 47 and the piezo 48 are also connected to the diagnostics logic, LED and piezo driver circuitry 43. The individual buttons 49 of the Keypad Command Center 44 comprise a simple one-of-twelve/common buss keypad. Signals from the one-of-twelve/common buss keypad 49 connect directly to the Microprocessor 38.

An input signal conditioner 50 connects trigger input signals, which signal the system when invasion of the system has occurred, to the Microprocessor 38. The trigger inputs include signals from the hood 51, the trunk 52, the sound and/or shock sensor(s) 53, the ignition 54, and door sensors 55 and 56. When the system is disarmed, either by a broadcast from the Keypad/Transmitter of one of the plurality of valid multi-digit access codes, or the broadcast from one of the plurality of encoded single-button transmitters, the vehicle's dome light illuminates for 30 seconds or until the ignition is turned on. This is done through the dome light relay 57, and provides a convenience for the operator.

These signals are fed to the Microprocessor which controls the output signal conditioning 58 to operate all the various peripheral components of the system. These components include the siren 59 if an invasion has occurred, a pulse circuit 60 to flash the vehicle's parking lights if an invasion has occurred, a silent paging transmitter 61, if desired; the release of the hood lock 62, door lock 63, door unlock 64, an engine interrupt relay 65, trunk release 66, an auxiliary for other functions 67, an external LED 68, and garage door opener control 69. Other functions, of course, can be programmed into the system.

Referring to FIG. 5, there is shown a block diagram of the invention's user identification system. The Microprocessor 38 monitors valid transmission signals 36 and 41 from the Keypad/Transmitter decoder 33 and the single-button transmitter decoder 34 (described in FIG. 3). Whenever a valid transmission signal 36 is recognized by the Microprocessor 38, or whenever a valid sequential multi-digit access code is entered (either upon the Keypad Command Center within the vehicle or upon the Keypad/Transmitter), a serial digital data signal from the user ID output 42 of the Microprocessor 38 is presented to a user ID decoder 70. There can also be a User, Data, Time, and Odometer Recorder 71 to record which one of the plurality of authorized operators used the automobile, along with the date, time, and vehicle odometer reading at that time. Additionally, at the time of determination of the specific user operating the system, a systems interface processor 72 can automatically control, through the automobile memory system:

the electronic entertainment systems 73;

the positions of the driver's seat, mirrors, and steering wheel 74;

the climate control 75;

the engine control such as maximum permissible speed 76;

as well as any other specific user identification function 77, such as a cellular phone.

The engine interrupt relay 65, of the present invention can be connected to various parts of the automobile such as the starter and/or the ignition system to disable the vehicle until such time as the system is disarmed by the operator. These various disabling methods are well known in prior vehicle alarm systems when utilized with a key or other single-button device as shown in U.S. Pat. Nos. 3,987,408 or 4,143,368. In addition, the various sensors for detecting intrusion into the vehicle placed in the doors, the trunk, the hood and including devices such as motion detectors or sound detector devices are also well known in the art.

As stated, the advantage of the device of the present invention is the use of a user-specific digital access code, which may be input from within the vehicle or broadcast by remote control. With the device of the present invention, an owner can use one Keypad/Transmitter to arm or disarm any number of automobiles within a group such as a family, each with a different keypad code and have in his possession only the one Keypad/Transmitter. In addition, each of the members of the family can have a separate access code identifiable by the system which can automatically control various automatic automobile functions such as seal position, mirror position, radio station preset control, etc. In addition, the Keypad/Transmitter allows the operator to broadcast a variety of signals to the system including signals to open the trunk, lock and/or unlock the doors, trip a panic alarm in the event of attack or assault, and even start the vehicle's engine by remote control if desired. These functions, as well as the entry and exit delay time, are all programmable through the Microprocessor, thus giving the operator control over his vehicle never before achieved.

Having thus described the invention, it is desired that the invention be limited only by the scope of the appended claims.

We claim:

1. A vehicle security system for a vehicle having an electrical system comprising, a transmitter designed to transmit a specially encoded predetermined digital signal, which constitutes a valid signal, a receiver for receiving the digital signal, means to determine whether the digital signal transmitted is one of a plurality of valid signals, means adapted to process valid signals, means to identify which one of the plurality of valid signals was received, means to control vehicle functions or system functions in response to which valid signal was received.

2. The device of claim 1 in which the transmitter comprises a keypad containing a plurality of individually labeled keys adapted to transmit a plurality of predetermined digital signals.

3. The device of claim 1 in which the transmitter comprises single button transmitter means containing means to differentiate among a plurality of single button transmitters, each from the other.

4. The device of claim 1 in which the transmitter comprises vehicle mounted data entry means adatped to enter specific encoded signals.

5. The device of claim 3 in which said means to differentiate among single button transmitters comprises user identification assignment means.

6. A vehicle security system for a vehicle having an electrical system comprising, a transmitter designed to transmit a specially encoded predetermined digital signal, which constitutes a valid signal, a receiver for receiving the digital signal, means to determine whether the digital signal transmitted is one of a plurality of valid signals, means adapted to process valid signals, means to identify which one of the plurality of valid signals was received, means connected to the vehicle electrical system to disable the vehicle by inhibiting an essential vehicle electrical circuit, means to prevent the operation of the vehicle disabling system, means to detect an intrusion into the vehicle, means to signal that an intrusion has occurred, and means to engage or arm the vehicle security system.

7. The device of claim 6 in which the transmitter comprises a keypad containing a plurality of individually labeled keys adapted to transmit a plurality of predetermined digital signals.

8. The device of claim 6 in which the transmitter comprises single button transmitter means containing means to differentiate among a plurality of single button transmitters, each from the other.

9. The device of claim 6 in which the transmitter comprises vehicle mounted data entry means adapted to enter specific encoded signals.

10. The device of claim 8 in which said means to differentiate among single button transmitters comprises user identification assignment means.

11. The device of claim 1 comprising recorder means to record pertinent data at the time of valid signal recognition.

12. The device of claim 11 in which said recorder means records at the time of valid signal recognition, the identity of the user, the date, time, location, and/or odometer reading of the vehicle.

13. The device of claim 6 comprising an alarm siren and means to activate said alarm siren upon detection of an intrusion.

14. The device of claim 13 comprising means to generate a plurality of audible siren chirps to indicate the arm to disarm or disarm to arm change of status of the system.

15. The device of claim 6 wherein the means to detect intrusions comprises a plurality of trigger means located at points of entry of the vehicle, and/or sensors adapted to detect sound, motion, vibration or glass breakage.

16. The device of claim 6 wherein the vehicle comprises a key activated ingition system, and entry doors, comprising means to automatically arm the system when the key has been turned to its off position, or removed from the ignition.

17. The device of claim 16 comprising an exit delay timer means adapted to delay the arming of the system for a predetermined exit delay time period after the last door of the vehicle has been closed.

18. The device of claim 17 comprising means to program the length of the exit delay time period.

19. The device of claim 17 comprising means to suspend the exit delay time period if any intrusion into the vehicle is detected prior to the expiration of the exit delay time period.

20. The device of claim 15 comprising means to continuously monitor all intrusion trigger means and store all intrusion occurances and means to notify the operator that an intrusion has occurred.

21. The device of claim 20 wherein the means to notify the operator of an intrusion comprises means to cause the siren alarm to sound a long blast upon entry of a valid disarm signal.

22. The device of claim 6 comprising a vehicle mounted keypad, said key pad comprising a plurality of light signal devices, one of which is adapted to glow constantly when the system is disarmed, flash slow-blinking-on when the system is armed, flash slow-blinking-off during the exit delay period and flash quickly when an intrusion has occurred.

23. The device of claim 22 wherein the means to notify the operator of an intrusion comprises an audio transducer located in the vehicle mounted keypad.

24. The device of claim 22 in which the vehicle mounted keypad comprises three LEDS, one to indicate the arm/disarm status, a second LED to indicate a valet mode, and a third LED to indicate a programming mode.

25. The device of claim 1 comprising means to conrol vehicle functions or vehicle accessory devices in response to which valid signal was recognized.

26. The device of claim 2 or 4 comprising means to open the trunk of the vehicle in response to recognition of a predetermined valid signal.

27. The device of claim 2 or 4 comprising means to lock and unlock the vehicle doors in response to recognition of predetermined valid signal.

28. The device of claim 2 or 4 comprising means to activate the alarm siren in response to recognition of a predetermined valid signal.

29. The device of claim 2 or 4 comprising anti-scan means adapted to activate an alarm siren whenever transmission of signals occurs in excess of a predetermined maximum time.

30. The device of claim 13 comprising means to reset the system and stop the alarm siren after a predetermined time period if no further intrusion is detected.

31. The device of claim 13 comprising means to flash the vehicle lights during the time the alarm siren is activated.

32. The device of claim 13 comprising means to silence the alarm but flash the vehicle lights to either indicate arm/disarm status or to indicate an intrusion.

33. The device of claim 1 comprising means to allow the operator to program features of the system.

34. The device of claim 33 in which said means to program the system comprises means to program: the disarm codes, whether or not specific trigger means are monitored, whether or not the alarm siren chirps to acknowledge arm and disarm commands, the entry and exit delay time periods and the alarm sounding duration time period.

35. The device of claim 33 where only one of the plurality of valid signals will permit programming of the system.

36. The device of claim 1 comprising means to override the selected parts of the system, and to place those parts in a non-operating state.

37. The device of claim 6 comprising means to automatically arm the system when the ignition key has been turned to its off position, or, in the alternative, to automatically arm the system from the remote transmitter.

38. The device of claim 15 comprising means to arm the system but ignore an unsecured trigger zone and monitor all remaining trigger zones.

39. The device of claim 1 or 6 comprising a non-volatile random access memory device adapted to retain the memory of all system parameters in the event power is disconnected or discharged.

40. The device of claim 22 comprising diagnostics mode means adapted to test the operability of a plurality of aspects of the system.

41. The device of claim 40 comprising an audio transducer device adapted to evaluate the quality of the transmitted signal received by the receiver from the transmitter.

42. The device of claim 40 comprising means to activate the LEDs to indicate which trigger zones show an intrusion.

43. An anti-theft vehicle security system for a vehicle having an electrical system comprising a radio frequency transmitter designed to transmit a series of predetermined digital pulses by modulating a predetermined RF carrier initiated by a remote keypad containing a plurality of individually labeled keys or a uniquely coded single button transmitter, a receiver for receiving the digital signals, a data decoder for decoding the transmitted pulses to determine any one of a plurality of valid transmissions which constitute a disarm code, a microprocessor adapted to receive a valid transmission signal, means to identify which one of a plurality of valid signals was transmitted, means connected to the vehicle electrical system to disable the vehicle by inhibiting an essential vehicle electrical ciruit, means to prevent the operation of the vehicle disabling system, means to detect an intrusion into the vehicle, means to signal that an intrusion has occurred.

44. The device of claim 43 wherein the vehicle comprises a key activated ignition system, comprising an exit time delay period means adapted to automatically arm the system at a predetermined time period after the ignition key is turned off.

45. The device of claim 44 comprising means to suspend the exit time delay period during any period in which an open door is detected during the exit time delay period.

46. The device of claim 43 in which the microprocessor scans the means to detect an intrusion continuously to determine whether an intrusion has occurred.

47. The device of claim 46 comprising means for the microprocessor to ignore a non-door intrusion if detected during the entry time delay period.

48. The device of claim 45 comprising means to terminate the automatic exit time delay period, by the use of the remote transmitter.

49. The device of claim 45 comprising an entry delay time period and means to ignore the entry delay time period as a result of arming the system by the use of the remote transmitter.

50. A vehicle control system for a vehicle having an electrical system and electrically controlled automotive functions comprising, a data entry means designed to transmit a specially encoded predetermined signal, a receiver for receiving the signal, means to determine whether the signal transmitted is one of a plurality of valid signals, a logic processing device adapted to receive valid signals, means to identify which one of a plurality of valid signals was transmitted, means connected to the vehicle electrical system to control the electrically controlled automotive functions in response to which one of the valid signals was received.

51. The device of claim 50 in which the transmitter comprises a keypad containing a plurality of individually labeled keys adapted to transmit a plurality of predetermined digital signals.

52. The device of claim 50 in which the transmitter comprises single button transmitter means containing means to differentiate among a plurality of single button transmitter, each from the other.

53. The device of claim 50 in which the transmitter comprises a vehicle mounted data entry means.

54. The device of claim 50 comprising recorder means to record pertinent vehicle data at the time of valid signal reception.

* * * * *